United States Patent [19]

Wehner

[11] Patent Number: 5,711,545
[45] Date of Patent: Jan. 27, 1998

[54] AIR BAG SYSTEM

[75] Inventor: Mark Wehner, Hoesbach, Germany

[73] Assignee: AlliedSignal Deutschland GmbH, Raunheim, Germany

[21] Appl. No.: 656,623

[22] Filed: May 31, 1996

[30] Foreign Application Priority Data

Jun. 2, 1995 [GB] United Kingdom ............... 95 11 137

[51] Int. Cl.$^6$ .................................................. B60R 21/16
[52] U.S. Cl. ..................... 280/728.3; 280/731; 280/732
[58] Field of Search ..................... 280/728.3, 731, 280/732

[56] References Cited

U.S. PATENT DOCUMENTS

| | | | |
|---|---|---|---|
| 3,910,595 | 10/1975 | Katter et al. | 280/728.3 |
| 5,316,822 | 5/1994 | Nishijima et al. | 280/728.3 |
| 5,501,890 | 3/1996 | Mills | 280/728.3 |

*Primary Examiner*—Kenneth R. Rice
*Attorney, Agent, or Firm*—Markell Seitzman

[57] ABSTRACT

An air bag system for use as a vehicle safety restraint, and a method for installing an air bag in a vehicle. The system comprises a folded air bag, means for securing the air bag to an instrument panel armature of the vehicle (e.g. by studs), a gas generator for inflating the air bag, a flexible air bag cover, a layer of foam preferably bonded to the cover, and layer of skin preferably bonded to the foam. The skin is of a material and finish consistent with the decorative finish to the vehicle and has a line of weakness adapted to split when subjected to a predetermined pressure such as that generated by the air bag inflating, to release the inflating air bag through the cover and the foam and skin layers. Preferably the line of weakness is arranged to perpendicularly intersect the direction of gas flow from the inflator so that release of the gas applies a point pressure on the line of weakness causing the skin to effectively zipper open and release the air bag. This system obviates the need for an expensive air bag deployment door and is more aesthetically pleasing to the vehicle owner since unsightly visible tear seams and door edges are eliminated.

20 Claims, 1 Drawing Sheet

AIR BAG SYSTEM

The present invention relates to an air bag system and to a method of assembling an air bag system for use as a vehicle safety restraint.

Air bags traditionally comprise hollow fabric bags which inflate in the event of a vehicle crash to form a protective cushion for a vehicle occupant against impact with the steering wheel, instrument panel or the vehicle doors.

The air bag is stored in a deflated tightly folded compact state in close proximity to an inflator such as a gas cylinder or a pyrotechnic gas generator, in a metal housing. The housing is closed off on the deployment side of the arrangement by a door which is adapted to allow the air bag to inflate and deploy therethrough. To this end the door may be completely removable from the housing opening and would then usually be hinged or tethered to the housing or to the vehicle instrument panel or steering wheel in which the housing was set. Alternatively the door is etched with one or more lines of weakness so that pressure from deployment of the air bag splits the door and releases the air bag.

Traditional air bag housing doors are metal and therefore expensive. They are difficult to manufacture with the requisite specification to enable consistent and reliable deployment of the air bag and they must be covered and contoured to match the finish on each particular vehicle instrument panel into which they are set.

According to one aspect of the present invention there is provided an air bag system for use as a vehicle safety restraint comprising:

a folded air bag:

means for securing the air bag to a part of the vehicle, means for inflating the air bag, a pliable flexible housing door comprising a flexible thin non-metallic air bag cover, a layer of foam adjacent to the cover, and a layer of skin adjacent to and covering the foam layer, wherein the skin is of a material and finish consistent with the decorative finish to the vehicle part to which the air bag is attached and the skin has a line of weakness adapted to sever when subjected to a predetermined pressure, to release the inflating air bag, through the split thus formed, through the cover and the foam and skin layers, wherein the foam and skin layers are continuous with foam and skin layers on the vehicle part to which the air bag is attached.

Preferably the inflator has a single outlet directed to inflate the air bag in a direction which intersects (preferably perpendicularly) the line of weakness of the skin.

According to a second aspect of the present invention there is provided a method of fitting a vehicle safety restraint air bag in a vehicle the method comprising:

folding an air bag into a generally flat configuration with an inflation opening exposed for connection to an air bag inflator, laying a flexible cover over the folded air bag, covering the air bag cover with a layer of foam, covering the foam layer with a skin layer to match the vehicle decor, forming in the skin layer a line of weakness, along which the skin opens when subjected to a predetermined pressure for releasing the air bag on deployment.

In one embodiment the cover surrounds the air bag. The cover may be tethered to the vehicle, for example a vehicle instrument panel armature.

Preferably the direction of gas flow into the inflation opening substantially intersects the line of weakness preferably perpendicularly.

Preferably the lines of weakness are etched though they may be scribed or laser seared into the foam and skin. Advantageously the foam is bonded to the air bag cover and the skin bonded to the foam layer.

According to a preferred embodiment the air bag cover is made of a material that can withstand the temperatures employed in foaming processes. Currently typical such temperatures are in the range 125° F.–145° F. (51.5° C.–63° C.) and most usually 130° F.–140° F. (54.5° C.–60° C.). Suitable materials for the air bag cover include polyester, nylon and homogenous plastics material.

The invention affords the possibility of a less expensive air bag system by eliminating the need for a door and housing and overcomes many of the disadvantages of known systems.

For a better understanding of the present invention and to show how the same may be carried into effect, reference will now be made to the accompanying drawings in which:

FIG. 1 shows an air bag 1 folded into a recess in an instrument panel armature 2.

Figure 1:
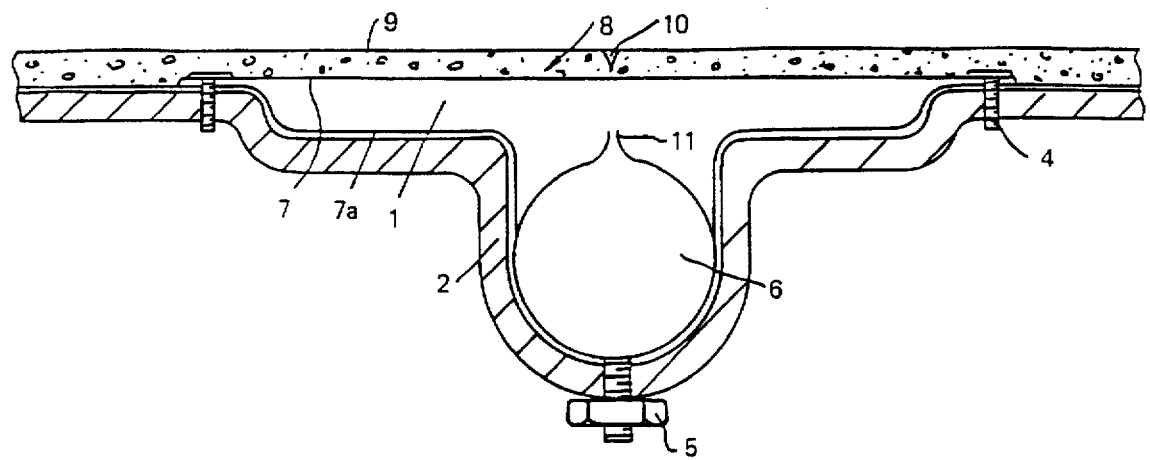
FIG. 1 is a cross-section of an air bag system according to the present invention.

A cylindrical gas generator 6 is shown seated in the armature 2. This would generally be inserted at one of the last stages of the assembly process. Gas outlet 11 directs inflation gas into the air bag 1 to inflate it.

Over the air bag is placed a protective cover 7 of a flexible lightweight material such as polyester, nylon or a homogenous plastics material which will withstand temperatures of around 130° F. (54.5° C.). The protective cover gives no structural strength, and could in fact be a paper based material. This cover may extend only over the top of the air bag as shown at 7 or extend all around the air bag as a protective bag indicated at 7a. The cover is attached to the armature 2 by studs 4 such as plastic so called "christmas tree" fasteners, and a nut and bolt 5. A layer of foam 8 is bonded to the protective cover 7 and a layer of skin 9 bonded to the foam 8. These bonding steps are traditionally performed as a one-step operation in a foaming machine, the operation of which is well known to anyone skilled in the field. The skin is of course chosen to match the vehicle decor and is applied to the whole instrument panel 2; or to the steering wheel or the door interior as is appropriate to the storage position for the uninflated air bag.

A line of weakness 10 in the skin 9 is arranged directly above the outlet 11 of generator 6.

Figure 2:
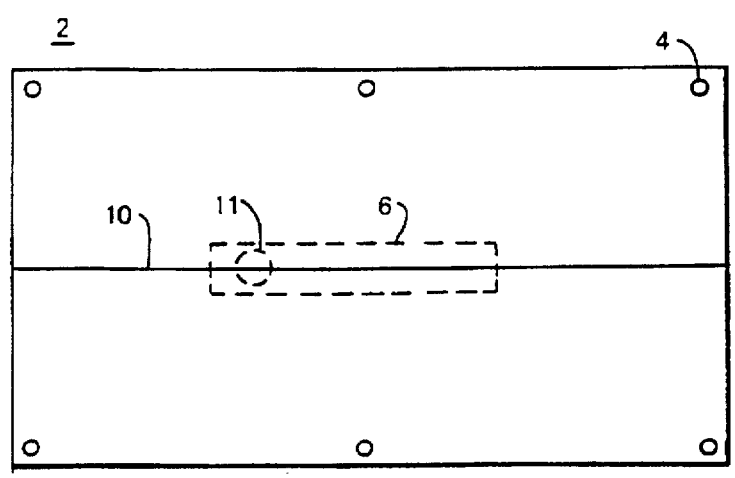
FIG. 2 is a schematic plan view of the system of FIG. 1.

FIG. 2 shows a schematic plan view of the system. The gas generator 6 is shown in broken lines to indicate its position in relation to the other parts. The protective cover 7 is fastened into instrument panel 2 at each corner and halfway along the long sides by attachments 4 such as the plastic christmas tree studs of FIG. 1.

The gas generator 6 may be a hybrid inflator of a type well known in the industry. It is arranged to have a single outlet 11 for the inflation gas arranged at a point along the line of weakness 10 in the skin 9. This single outlet has the advantage of dispensing with a manifold which is traditionally required with inflators and adds to their cost. On activation of the inflator the gas emerges from outlet 11 into air bag 1 and applies a point pressure on the line of weakness 10 causing the skin 9 to effectively zipper open, splitting the foam layer 8 and releasing the air bag through the burst slit thus formed. The skin therefore effectively simply breaks open; there is no hinge or controlled rotating motion.

Since the air bag cover 7 is mechanically attached to the instrument panel by fasteners 4 it stays in place while the air bag slides along its inside surface to emerge through the split layers of foam 8 and skin 9. The attachment of the cover and the bonding of the foam and skin to it ensure that a minimum of foam debris is generated in the air bag deployment process.

With the air bag system of the invention no separate air bag housing or deployment door is necessary resulting in considerable cost and assembly time savings. The foamed and skinned finish is more aesthetically pleasing to a vehicle owner since, without the deployment door, there is no need for unsightly visible tear seams, and nor do the edges of the door to interrupt the appearance and contour lines of the instrument panel.

The air bag system of the invention can advantageously be used with the retention methods described in U.S. Pat. Nos. 4,944,527, 4,964,654 and 5,062,664 though no limitation of this invention to those disclosures is intended or implied. It will be seen that this system may easily be adapted for use with drivers' air bags mounted in steering wheels and/or side impact air bags, mounted in door or roof panels or in a vehicle seat or headrest.

I claim:

1. An air bag system for use as a vehicle safety restraint comprising:

a folded air bag:

a vehicle part having an opening therein, means for securing the air bag to the vehicle part adjacent to the opening, means for inflating the air bag, a deployment door means, formed as a component of the vehicle part, for providing a tearable covering about the opening comprising:

a) a pliable flexible thin non-structural protective layer over a portion of the air bag in the vicinity of the opening, b) a layer of foam covering the protective layer, and c) a layer of skin adjacent to and covering the foam layer, wherein the skin is of a material and finish consistent with the decorative finish to the vehicle part to which the air bag is attached and the skin has a line of weakness adapted to sever when subjected to a predetermined pressure, to release the inflating air bag, through the split thus formed, through the protective layer and the foam and skin layers, wherein the foam and skin layers are continuous with foam and skin layers on the vehicle part to which the air bag is attached.

2. An air bag system as claimed in claim 1 wherein the line of weakness is etched.

3. An air bag system as claimed in claim 1 wherein the line of weakness is scribed.

4. An air bag system as claimed in claim 1 wherein the line of weakness is laser seared.

5. An air bag system as claimed in claim 1 wherein the foam layer is bonded to the protective layer.

6. An air bag system as claimed in claim 5 wherein the skin layer is bonded to the foam layer.

7. An air bag system as claimed in claim 1 wherein the thin protective layer comprises a material that can withstand temperatures of between 130° F. and 140° F. (54.50° C.–60° C.).

8. An air bag system as claimed in claim 1 wherein the protective layer surrounds the folded air bag.

9. An air bag system as claimed in claim 1 wherein the securing means comprises a mechanical attachment of the protective layer to the vehicle.

10. An air bag system according to claim 9 wherein the mechanical attachment comprises studs tethering the protective layer to a vehicle instrument panel.

11. An air bag system as claimed in claim 1 wherein the protective layer has a line of weakness formed therein substantially aligned with the line of weakness in the skin layer.

12. An air bag system as claimed in claim 11 wherein the line of weakness in the cover is perforation line.

13. An air bag system as claimed in claim 1 wherein the inflation means comprises an inflator having a single gas outlet aligned with the line of weakness.

14. An air bag system as claimed in claim 11 wherein the inflation means comprises an inflator having a single gas outlet aligned with the line of weakness.

15. A method of securing a vehicle safety restraint air bag in a vehicle, the method comprising the steps of:

a) forming a substrate of an instrument panel with a recess having an open mouth;

b) placing an inflator and air bag within the recess, c) folding the air bag into a generally flat configuration with a portion of the air bag adjacent the open mouth, d) laying a flexible protective layer over the folded air bag, e) covering the air bag cover and instrument panel substrate with a layer of foam, f) covering the foam layer with a skin layer to match the vehicle decor, g) forming a line of weakness in the skin layer, along which the skin opens when subjected to a predetermined pressure, for releasing the air bag on deployment.

16. An air bag system for use as a vehicle safety restraint comprising:

an instrument panel including a substrate, a foam layer and a skin layer, the substrate having an opening therein and a recessed portion below the opening;

a folded air bag located at least in part in the recessed portion adjacent the opening;

inflation means for inflating the air bag, located within the recessed portion below the folded air bag;

the layer of foam covering the opening and adjacent portions of the substrate; and a layer of skin covering the foam, wherein upon inflation of the air bag the foam and skin are caused to open.

17. The device as defined in claim 16 further including a pliable, non-structural thin protective layer disposed between the foam and the air bag.

18. The device as defined in claim 17 wherein the protective layer is secured about the opening in the substrate.

19. The device as defined in claim 17 wherein the protective layer generally surrounds the air bag.

20. The device as defined in claim 16 wherein the protective layer is a paper based product.

* * * * *